No. 740,624. PATENTED OCT. 6, 1903.
H. BRINKHAUS.
EYEGLASSES.
APPLICATION FILED JAN. 31, 1903.
NO MODEL.
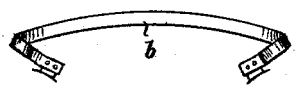
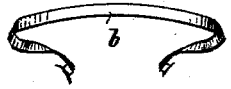
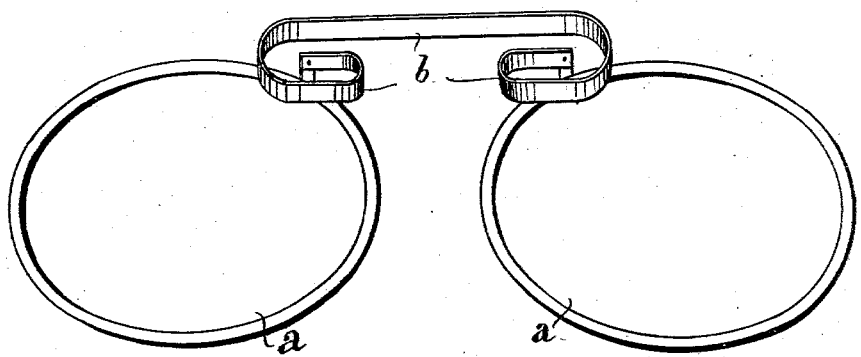
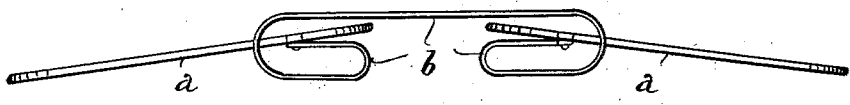

No. 740,624. Patented October 6, 1903.

UNITED STATES PATENT OFFICE.

HUGO BRINKHAUS, OF HAMBURG, GERMANY.

EYEGLASSES.

SPECIFICATION forming part of Letters Patent No. 740,624, dated October 6, 1903.

Application filed January 31, 1903. Serial No. 141,374. (No model.)

*To all whom it may concern:*

Be it known that I, HUGO BRINKHAUS, doctor of medicine, a citizen of the United States, residing at Hamburg, Germany, have invented certain new and useful improvements in the construction of what are commonly known as "Pince-Nez Eyeglasses;" and I do hereby declare the following to be a full, clear, and exact description of the invention, such as will enable others skilled in the art to which it appertains to make and use the same, reference being had to the drawings and the letters thereon.

Figure 1 represents a front view of a pair of eyeglasses mounted in accordance with my invention; Fig. 2, a plan view of eyeglasses at an angle; Figs. 3 and 4, the improved spring, their ends differently shaped, showing how the spring may be connected with different forms of eyeglasses in the market.

This improvement has for its object to permit the glasses to be placed in position on the nose without causing them to make a partial rotary movement around their optical axes, as is the case with the usual kind of eyeglasses. In stretching the spring while placing the eyeglasses in position on the nose the glasses will make a movement in the plane perpendicular to the plane of the glasses, either forward or sidewise or both ways, but will not make a rotary movement around their optical centers. This is of importance where cylinders or prismatic glasses are used in combination or not with spherical glasses. Instead of the usual band-spring a helical spring has sometimes been used in combination with and dependent upon a guiding-bar in order to connect the two glasses and enable them to be placed upon the nose without making a rotary movement toward one another. The glasses in this case approach one another in a straight line and remain always in one plane.

According to my invention I employ a spring the form and mode of application of which insure the same results in a simpler manner with additional advantages. In the accompanying drawings the spring *b* possesses elasticity only in a plane perpendicular, or nearly so, to that of the glasses. This elasticity is obtained by the hoop or bow shape of the spring in the described plane or by the parallel position of the flat surface of a band spring to the surface of the glasses *a*. The result is that the glasses can only be moved in a plane more or less perpendicular to themselves, but cannot make a rotary movement around their optical axes. The glasses may be attached to the spring at such an angle that their planes become parallel only after having been placed on the nose in the proper position, and in using cylindrical glasses or the like the direction of their axes will remain in the same position notwithstanding the displacement of the glasses out of their position relatively to the horizontal and vertical medium lines of the eyes. Another advantage of this construction is that the spring may be fastened to the sides of the eyeglass or its frame instead of upon their periphery.

Having thus fully described my invention, I claim the following features as my invention, which I desire to secure by Letters Patent:

1. The combination with eyeglasses of a spring horizontally disposed and located as high as the line connecting the upper border of the glasses and projecting with its extremities beyond the rear plane of the glasses being that plane which is nearest to the eyes, as shown and described.

2. The combination with eyeglasses of a spring horizontally disposed and located as high as the line connecting the upper border of the glasses in the rear of that plane of the glasses which is nearest to the eyes, as shown and described.

3. The combination with eyeglasses of a spring horizontally disposed and located as high as the line connecting the upper border of the glasses, with loops at its ends which project beyond that plane of the glasses which is nearest to the eyes, as shown and described.

4. The combination with eyeglasses of a spring horizontally disposed and located as high as the line connecting the upper border of the glasses, projecting beyond that plane of the glasses which is nearest to the eyes and being fastened on the rear side of the glasses, as shown and described.

5. The combination with eyeglasses of a spring horizontally disposed and located as high as the upper border of the glasses with loops at its ends projecting beyond that plane of the glasses which is nearest to the eyes and being fastened on the rear side of the glasses as shown and described.

In testimony whereof I have signed my name to this specification in the presence of two subscribing witnesses.

HUGO BRINKHAUS.

Witnesses:
E. H. L. MUMMENHOFF,
OTTO W. HELLMRICH.